United States Patent [19]
Keskes et al.

[11] Patent Number: 5,179,518
[45] Date of Patent: Jan. 12, 1993

[54] METHOD OF PROCESSING SEISMIC REFLECTION DATA IN ORDER TO OBTAIN IMPROVED SEISMIC SECTIONS

[75] Inventors: N. Keskes, Lons; P. Boronad; M. Verprat, both of Pau; G. Sibille, Saint Martin le Vinoux, all of France

[73] Assignee: Societe Nationale Elf Aquitaine (Production), Courbevoie, France

[21] Appl. No.: 562,266

[22] Filed: Aug. 3, 1990

[30] Foreign Application Priority Data

Aug. 4, 1989 [FR] France .................................. 89 10519

[51] Int. Cl.$^5$ ............................................. G06F 15/21
[52] U.S. Cl. .................................... 364/421; 364/422
[58] Field of Search ................................. 364/421–422

*Primary Examiner*—Gail O. Hayes

[57] ABSTRACT

A method of processing seismic recordings in order to obtain an improved seismic section by taking into account, during summing, the real geometric configuration of the alignments of signals in the collection of elementary recordings before sum.

11 Claims, 3 Drawing Sheets

METHOD OF PROCESSING SEISMIC REFLECTION DATA IN ORDER TO OBTAIN IMPROVED SEISMIC SECTIONS

BACKGROUND OF THE INVENTION

1. Field of the Invention The present invention relates to a method of processing seismic reflection data for attaining a better knowledge of the structure of the geological layers of an environment to be explored.

2. Description of the Background Art

In very general terms, it is considered in geophysics that the subsoil is constituted from a stack of geological layers having different characteristics which are organized in space according to a certain geometry.

In order to define the geometry of the layers of the subsoil, subsoil exploration specialists, in particular geophysicists engaged in oil exploration, use a special technique called "seismic reflection" which consists of transmitting acoustic signals from different points of the surface of the ground, called transmitting points, and thereafter receiving at different points on the surface of the ground, called receiving points, the acoustic signals after they have been propagated in the subsoil and have been reflected at the individual acoustic boundaries which constitute the limits between different geological layers and are therefore called reflectors. Each of the elementary recordings, which are a function of time and are associated with a given transmitting point and a given receiving point, constitutes what is called a "trace".

For a given transmission, a simultaneous recording is made at different receiving points, over a predefined time, of the signals reflected by the different reflectors of the subsoil. This technique allows traces carrying redundant information to be grouped in collections.

The recorded traces are processed in order to obtain individual images of the subsoil called "seismic sections", which can be assimilated as vertical cross-sectional planes of the subsoil on which the reflectors appear as lineations superimposed on each other. The processing technique commonly used consists of summing between the traces of each collection after having applied a certain number of corrections to them and thus obtaining a "sum trace" associated with a particular point of the surface. The choice of the collections and the corrections are based on simplifying hypotheses relating in particular to the geometric structure of the layers of the soil, the latter being assumed to be horizontal and homogeneous. In this case, the reflection point of the signal is located on a vertical passing through the mid point of the segment joining the transmitting and receiving points on the surface of the ground. Each of the collections will then be constituted by all of the traces associated with a same mid point. To each of the traces there is applied at least one correction called the "dynamic correction" whose purpose is, starting from expansion of the time scale, to correct the effects of obliqueness of the transmitter-reflector-receiver paths, which are different for each of the traces of a same collection, in order to obtain the trace which would be obtained directly on the ground if the transmitter and the receiver were merged at the same point on the surface of the ground.

All of the processings currently applied in a routine manner in seismic reflection consist in concentrating the redundant data carried by collections in a single sum trace, by horizontally summing all of the traces of a same collection. A sample of the sum trace is the result of the summing, weighted or not weighted, of the N samples at the same time each belonging to a different elementary trace, N being the number of these traces.

The assumption that the layers are horizontal, if it is not fully justified, leads on the one hand to a considerable geometric distortion of the image of the subsoil, because, by operating in multiple cover, data originating from points which are not on the vertical from the mid point are positioned on this vertical, and on the other hand to a lowering of resolution, because data is summed which comes not from the same point, which is the case if the assumptions are true, but from different points of the subsoil, which has the effect of degrading the signal. This distortion and this degradation can be considerable to the point of falsifying the interpretation which is then made of these seismic sections, particularly in the case of a disturbed subsoil geometry or of fine structures for which a high resolution is necessary. Various processings exist, called migrations, all of which have the object of restituting an image of the subsoil which is as exact as possible, by replacing the various received data in the correct position. Extensive literature exists on the various migration methods and can be referred to for more information. A differentiation will however be made between the migrations called "after sum" which are performed on the sum traces and which take into account the geometric distortion alone, and the "before sum" migrations. The before sum migrations are performed on each of the traces of each of the collections of elementary traces before summing, and theoretically have the effect of putting into phase, i.e. of allocating a same depth or same time to signals which relate to the same reflection point.

A collection of elementary traces on which a before sum migration has been applied can be considered as an elementary "mini-section" of the subsoil in a plane whose coordinate axes are distance X and time or depth T over which the signals relating to a same reflector are horizontally aligned. The quality of such a migration applied to real data in fact heavily depends on knowledge of the speed of propagation of the wave in each of the layers of subsoil, called the "interval speed". Errors in the interval speed cause distortions of the alignments, which because of this, are no longer horizontal such that the signal obtained after horizontal summing is degraded, this degradation being able to lead to errors or difficulties in interpretation.

Another object of the summing in seismic reflection is to improve the signal/noise ratio, the summing reinforcing the amplitude of the significant signals present in each of the traces, theoretically in phase, and attenuating, by destructive summing, the random noise from one trace to another.

This object will obviously not be achieved if the signals are not in phase. A summing carried out in poor conditions, i.e. following a line corresponding to a theoretical alignment and not to a real alignment, has the effect of reducing the amplitude of the sum signal and the apparent frequency. If the line along which the summing is performed is distorted, to take account of these phase shifts of signals from one elementary trace to another, results in that these effects do not occur and the sum signal obtained is an optimum signal.

SUMMARY OF THE INVENTION

The processing method of the present invention enables the disadvantage of the conventional horizontal summing to be overcome by taking into account, during the summing (which is no longer horizontal), the real geometric configuration of the alignments of signals on the elementary collections before summing, and thus an optimum sum can be obtained even in the case in which the signals associated with a same reflector in the collections are not horizontally aligned.

A method of processing signals recorded on the surface of the ground during the exploration of an environment by seismic reflection according to an embodiment of the invention is of the type consisting in summing collections of elementary recordings obtained by the so-called multiple cover technique after having applied to them a processing such that on each of the collections, referenced in a plane having coordinate axes of distance X and time or depth T, the reflections from the subsoil appear as sub-horizontal lineations associated with extrema of recordings correlating with each other.

A method according to an embodiment of the invention is characterized in that for each of the collections initially the summing of the samples of the elementary recordings associated with the same time is carried out in order to obtain a conventional sum trace, from this conventional sum trace the dimensions $T_i$ for which its amplitude exhibits peaks $P_i$ are taken.

The peaks taken into account shall for example be all the extrema of the trace or only the maxima of the envelope of the rectified sum trace, the picking of the lineations present in the collection is carried out, in the collection there is selected, according to a given process, within each range $PL_i$ of predetermined width $T_i-\Delta T_i$, $T_i+\Delta=T_i$, surrounding each of the dimensions $T_i$, and intercepting a certain number of lineations, at the most one of these lineations considered as the most representative of the studied range, $L_i$, a summing corridor of predetermined width is defined which surrounds a pivot curve passing through the points $P_j$ of coordinates $T_j$ each belonging to a selected lineation $L_j$, within this corridor the summing of the samples located along the lineations in order to obtain a sum trace is carried out according to the method for which the amplitude at the time $T_j$ is the result of the summing along the lineation $L_j$ and the amplitude at a time T between two times $T_j$ and $T_j+1$, the result of the summing of the samples located on a lineation being obtained by interpolation between the successively selected lineations $L_j$ and $L_j+1$.

According to another embodiment the processing method according to the invention is characterized in that the process of selecting the lineation which is the most representative of each of the ranges $PL_i$ includes two steps, the first step consisting in selecting in each of the ranges at least two lineations conforming to a given criterion, this selection being carried out on the one hand by starting with the dimension $T_1$ associated with the peak of maximum amplitude in absolute value of the conventional sum trace and ending, in order, with the dimension $T_k$ associated with the peak of minimum amplitude in absolute value taken into account on the conventional sum trace, and on the other hand by not taking into account lineations if they have already been selected once, and the second step consisting in choosing just one of these two or more lineations, selected according to a predetermined criterion taking into account at least the lineations selected in the range above or below that of the selection.

According to a still further embodiment, the processing method according to the invention is characterized in that the selection is carried out according to a given criterion, this selection being carried out on the one hand by starting with the dimension $T_1$ associated with the peak of maximum amplitude in absolute value taken into account on the sum trace and ending, in order, with the dimension $T_k$ associated with the peak of minimum amplitude in absolute value taken into account on the sum trace, and on the other hand by not taking account of the lineations if they have already been selected once.

Preferably, the selection criterion for a lineation in a range depends on the average of the absolute amplitudes of the extrema associated with the lineation, this average having to be greater than the average of the absolute amplitudes of the extrema associated with the lineations of the range which are not selected.

More generally, a method according to the invention can be applied in any field, in particular in image processing, when it is sought to retain the data contained in a two-dimensional image representing the values assumed by a parameter according to two axes, the said values being organized according to lineations, or when working on collections of redundant recordings in order to increase the signal/noise ratio of the data contained in these recordings.

The method of the invention will be very easy to implement if use is made of automatic picking techniques and the computer is used not only as a means of storage and display but also as a means of image analysis insofar as each seismic mini-section can be considered as a two-dimensional image $I(k, l)$ where the index k represents, in ordinates, the time or depth and the index l indicates, in abscissas, the number of the seismic recording or a distance, I being the amplitude of the signal. For example, assuming that the amplitude I is represented by different grey levels, the detection of lineations can be reduced to a problem of edge detection or contouring, the computation of values characterizing each lineation being able to be carried out at the same time as the picking.

Under these conditions, applied for example to "common receiving point" collections on which a before sum migration has been applied, the processing method according to the invention allows the obtaining, by taking into account the defects due to imperfections in the model of speeds used for the before sum migration, and for an equivalent cost, of a seismic section of much better quality and with much higher resolution than that produced by conventional summing.

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

Other advantages and characteristics will be understood on reading the description of an embodiment of the present invention, relating to the obtaining of a seismic section from elementary recordings on which a before sum migration has been carried out, referring to the appended drawings, which are given by way of illustration only and thus are not limitative of the present invention, in which.

DETAILED DESCRIPTION OF THE PREFERRED EMBODIMENTS

Figure 1:
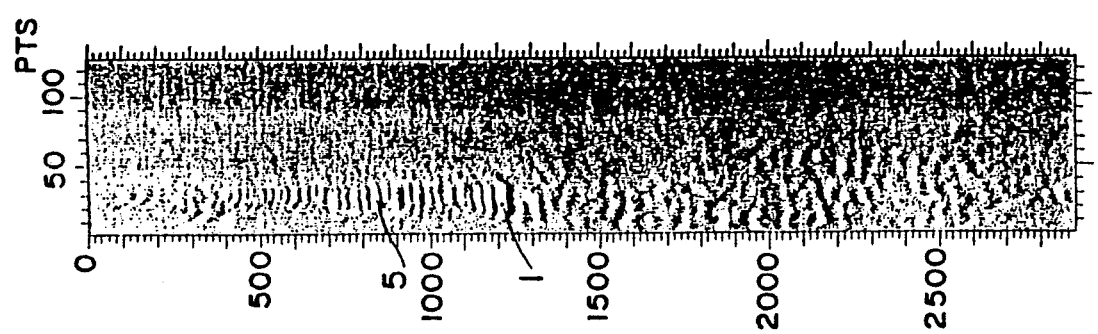
FIG. 1 shows the image of a CDPG (Common Depth Point Gather) collection of seismic recordings having to be summed as a function of a distance (in meters, in abscissas) and of a time (in milliseconds, in ordinates) on which a before sum migration has been carried out.

Each recording constituting a column of the image in FIG. 1 is the result of a preliminary processing of the signal carried out on the elementary recordings recorded on the surface of the ground, comprising successive operations including, using terms well-known by seismologists in the oil exploration field, static corrections, dynamic corrections and a "before sum" migration.

The number of traces belonging to each of the collections is a function of the geometric characteristics of the device laid out at the surface of the ground and in particular of what is called the "cover" i.e. the number of elementary traces recorded which can be associated with the same vertical of the subsoil in the case of horizontal structures, and of the characteristics of the chosen before sum migration.

The object of the processings carried out on the elementary traces is the simulation of a recording transmitted and received at the same point on the surface of the ground, the transmitted energy propagating along the vertical passing through that point.

The choice of processings made from among the range of processings offered to the geophysicist to allow him to end up with a collection such as that of FIG. 1 is of no importance for the application of the method according to the invention.

FIG. 1 comprises 128 traces which can be considered as so many seismic images, with more or less noise content, of a same vertical, constructed on the basis of so many distinct elementary traces associated with different transmitting and/or receiving points on the surface.

The lineations visible in FIG. 1, such as the lineation (1), should theoretically be horizontal since each of them defines a same point of the subsoil characterized by the same vertical propagation time. They are not horizontal because of the noise present in the elementary recordings, which is always very high in seismic reflection to the point of often masking the significant signal, and also because of the imperfection of the model of propagation speeds used for the processings carried out on the elementary traces.

In order to define the lineations along which the optimized summing according to the method of the invention must be carried out, it is necessary to carry out, on the collection of elementary recordings, a picking of the different lineations present on the image. Several methods of picking seismic horizons are available on the market and any of these can be used here.

Figure 3:
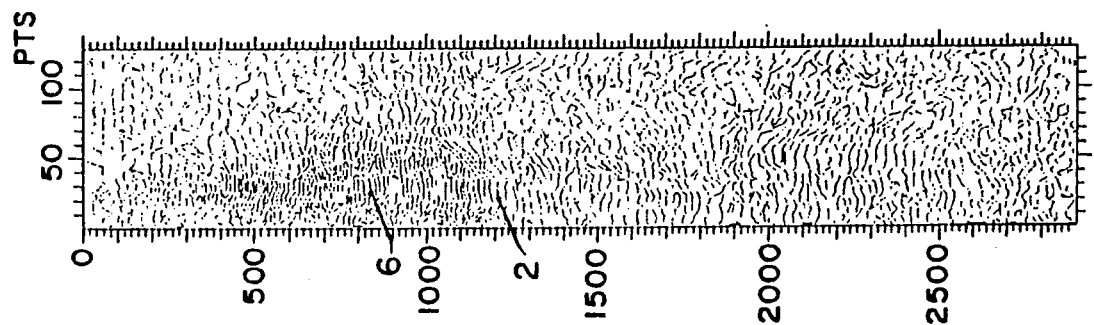
FIG. 3 shows the result of a picking of seismic horizons carried out on the collection of FIG. 1.

FIG. 3 shows the result of such a picking developed by Société Nationale Elf Aquitaine (Production) and carried out using a computer.

In this figure, for example, the line (2) corresponds to the result of the picking of the lineation (1) in FIG. 1. Each line in FIG. 3 corresponds to the boundary between a range where the slope of the signal is positive and another range where the slope is negative. In other words, these lines indicate the places of the extrema, each associated with positive or negative peaks of the signal which can be correlated with each other. They are interrupted when it has not been possible to find signals whose peaks correlate on two adjacent traces, i.e. are associated with sufficiently close times. It is obvious that not all of the lines in FIG. 3 are significant, and that many of them are associated with noise.

It is therefore necessary to select in such an image those of the lines resulting from the picking which are actually associated with physical reflections on a reflector in the subsoil. It can be assumed that the long lines which are associated with high amplitude peaks, such as the line (2), are part of potentially significant lines, and that they can be made to correspond with a peak on the horizontal sum trace even if the latter is not optimum. Thus, for example, the peaks (3), (4) in FIG. 2, which shows the amplitude of the trace obtained by the horizontal summing of the elementary recordings in FIG. 1, can be considered as the mark of the lineations (1), (5) in FIG. 1 associated with the pickings (2), (6) of FIG. 3.

Figure 2:
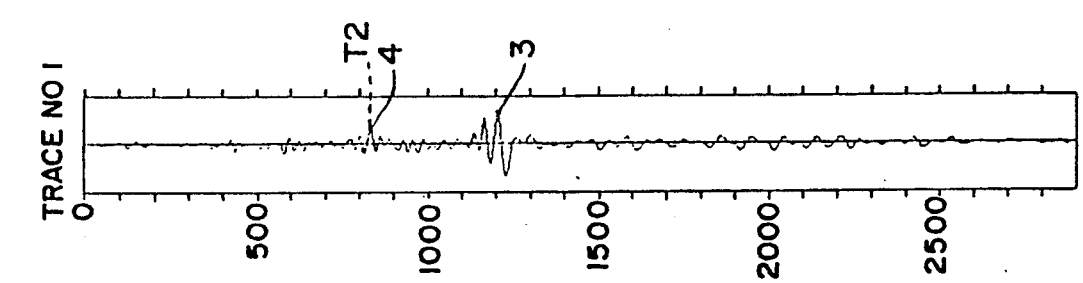
FIG. 2 shows the horizontal sum trace corresponding to the collection of FIG. 1.

This horizontal summing is carried out for each of the collections of recordings in order to obtain as many sum traces equivalent to those of FIG. 2 as there are collections.

On each of these sum traces, the peaks associated with amplitude extrema are selected and classified in order of decreasing absolute amplitude, each peak Pi being characterized by its amplitude Ai, the corresponding depth or time Ti, and its order number i. The reading of the extrema can be carried out on the amplitude in absolute value of the sum trace, both the positive and negative amplitude peaks being equally taken into account. The classification can also be carried out solely on the basis of the peaks associated with regression phase starts: the selected and classified peaks then also correspond with a maximum of the envelope curve of the straightened sum trace.

Depending on the problem presented, it is possible to conceive other methods of selecting peaks and the two examples given here must not be considered as limits to the method according to the invention.

In the embodiment given here by way of example, the classification of the extrema has been carried out on the peaks associated with regression phases, corresponding to the second mode of selection given previously. In this precise case, the peaks (3) and (4) of FIG. 2 are the first ones taken into account, successively and in that order. With these two peaks are associated their amplitudes A1, A2 and their times T1, T2. With the lowest amplitude peak $P_R$, R being the total number of peaks to be classified in the sum trace, there will be associated the amplitude AR and the time $T_R$.

The next step of the processing consists in selecting the lineations which are considered to be the most representative of the collection from the point of view of a certain criterion. The criterion used in the embodiment described here is the average amplitude, the lineation considered to be the most representative being that which has the highest average amplitude, the average amplitude here being defined as the average of the amplitudes of the peaks $P_{jk}$, k being the index of the elementary trace in the collection, constituting the lineation lj.

The selection of the lineations is carried out over time ranges PLi surrounding each of the dimensions Ti for which an extremum Pi has been noted and classified, Ti being the order number, varying from 1 to R, of the extremum Pi after classification in order of decreasing amplitude. The range widths are defined previously. For greater simplicity, in this case a constant width 1 has been chosen, equal to 16 milliseconds and centered on each of the dimensions Ti: the first range processed is therefore the range of width 1 centered on the time T1 of the selected peak of highest amplitude, and limited by the times $T1-\frac{1}{2}$ and $T1+\frac{1}{2}$. The average amplitude can be computed by taking into account only the peaks $P_{jk}$ contained within the studied range PLi. Preferably a range width will be chosen such that a quarter of the average period of the signals of the sum trace is greater than it, but it is also possible to envisage choosing a very large 1 in order to take account of the lineations over their entire length. The width of the time ranges can be variable as a function of T: it is possible, for example, to envisage adapting it to the pseudo-period of the peak Pi. Similarly, it is not essential for the range to be centered on the time Ti.

In reality, at least one lineation crosses each of the time ranges, and more probably two or more do so. These lineations lj, j here being an index varying from 1 to S, S being different from R, pass through extrema of elementary traces which can be correlated from one trace to another. For each of them the average amplitude of the correlated maxima contained in this studied range is computed. For example, if the lineation lj passes through the four elementary recordings 1 to 4 in the studied time range, and aj1, aj2, aj3 and aj4 are the values of the associated maxima on each of these four traces connected to each other by the picking program, the average is calculated of these four values aj1, aj2, aj3, and aj4 which is allocated to the lineation lj. Once this work has been carried out for each lineation intercepting the time range, there is selected from among them the lineation or lineations (for example two) to which the highest average amplitude or amplitudes are allocated. It is possible to arrive at the final objective, which is the selection of the most representative elementary lineation per selected time range, in one or more successive sorting steps, each step consisting in selecting a theoretical number of lineations, which perhaps will not be reached and reducing in number with the steps, over each of the ranges. There are many selection criteria and the average amplitude criterion used for the processing of the real data of FIG. 1 is only an example: in particular it may be desired to also take account of the length of the lineations.

Figure 4:
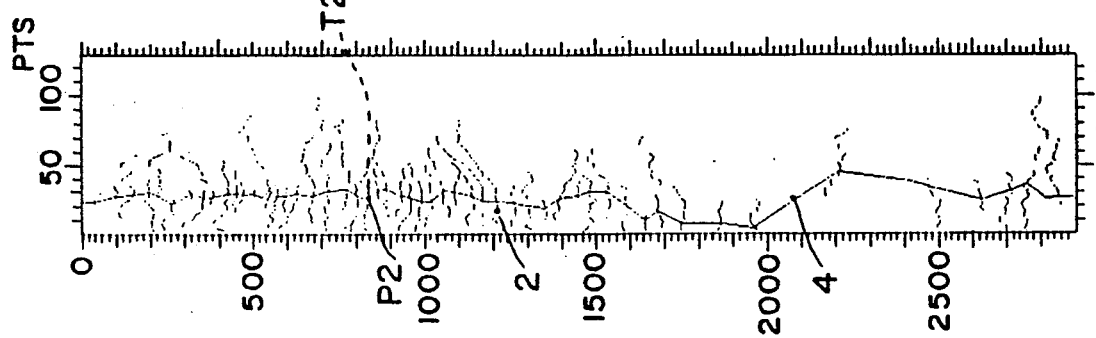
FIG. 4 shows the selected lineations, and the pivot curve of the summing corridor for the collection of FIG. 1.

FIG. 4 shows the result of the selection carried out on the picking of FIG. 3 in two steps. In a first step there has been selected in each of the ranges PLi, in increasing order number, the two highest lineations intercepting the said average amplitude range.

After having worked on the range centered on the time T1 of the highest amplitude peak P1, this same work was carried out for the range of width 1, centered on the time T2 of the peak P2 having the highest amplitude after that of the peak P1, and so on until the range associated with the peak PR of lowest amplitude. No lineation lj has been selected twice: assume for example that a first working range is next to or slightly superimposed on a second range 1 and that four lineations $l_1$, $l_2$, $l_3$, $l_4$, intercept this second range, the lineation $l_2$ having already been selected for the first range, the choice of the two most representative lineations of the second range will be made between the lineations $l_1$, $l_3$ and $l_4$.

Then, in a second step, that one of the two lineations which must be finally selected has been chosen.

Since a lineation can only be selected once in a selection process having several steps, it can be seen that for certain ranges, it will not be possible to reach the theoretical number of lineations per range. It is even possible that for certain ranges no lineation can be selected: the number of lineations finally selected will therefore be less than the number R of peaks taken into account on the conventional sum trace.

If the theoretical number of lineations to be initially selected per range is greater than one, a second sort will be necessary in order to select which of the lineations will be finally retained.

Several methods of choosing the lineation which must be finally selected in the time range PLi can be envisaged by those skilled in the art without departing from the scope of the invention.

Preferably, the result of the first sort of the lineations is made to intervene in at least one or other of the immediately higher ranges (associated with a shorter time Ti) or immediately lower ranges (associated with a longer time Ti).

Figure 5:
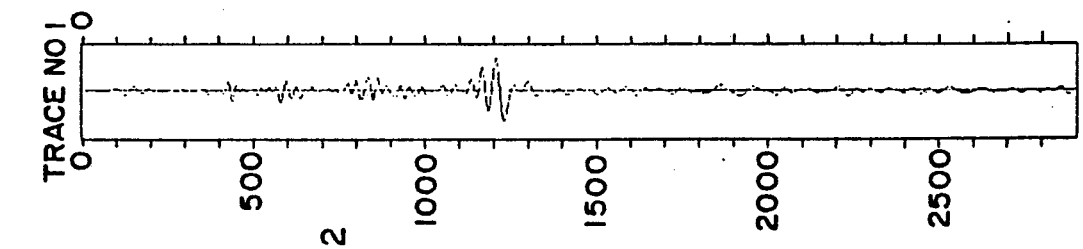
FIG. 5 shows the sum trace obtained by the method according to the invention corresponding to the collection of FIG. 1 and taking into account the picking of FIG. 4.

A simple means, used in the example described here, for selecting which of the two lineations must be finally chosen is as follows: Ai and Bi being the average amplitudes of the two lineations retained during the first sort, the one whose average amplitude summed with the average amplitude of the lineation finally selected in the previous range is the highest is chosen. The selection can be carried out beginning with the range associated with the shortest time and ending with the range associated with the longest time. For each range PLi, it is possible to define a particular point Pi belonging to the finally selected lineation and Ti being its coordinate in T. FIG. 5 shows the result of the final selection carried out in two successive steps starting from the picking of FIG. 2.

The joining of the successive points Pi in order number i, allows the construction of a broken line called the pivot curve which can also be defined as an optimum energy curve. Such a curve (7) is shown in FIG. 4.

A zone of predefined width enclosing the pivot curve is then delimited. Only the samples of traces included within this zone will be taken into account for the summing, in such a way that the zone surrounding the pivot curve defines a genuine summing corridor. The width of the corridor can be expressed as a number of traces, this number being sufficiently large (for example 15 traces for a collection of 48 traces or more), the corridor in this case being delimited by two broken lines identical to the pivot curve but each of them offset with respect to the latter along the abscissas, axis X. The width of the summing corridor can be constant or variable, preferably decreasing, as a function of time or of the depth T. The corridor can be centered on the optimum energy curve, the same number of traces being taken into account on either side of the pivot trace at the time Ti to which the point Pi belongs, or on the contrary, can be off-centered.

The width of the corridor can again be chosen to be very large, at least equal to the number of traces in the collection, if it is desired to take the lineations into account in their entirety.

The summing is carried out within the summing corridor, along the lineations, the amplitude of the sum trace obtained by means of the method according to the invention at the time Ti being the sum (weighted or not weighted) of the amplitudes of the peaks belonging to the lineation Li passing through the point Pi on the one hand and contained within the summing corridor on the other hand.

The amplitude of the sum trace for a time T included between the times Ti and Ti+1 will be equal to the sum of the samples included within the summing corridor and located on a lineation created by the interpolation between the lineations Li and Li+1. Assume that P is the point of ordinate T belonging to the segment (Pi, Pi+1) of the pivot curve, and R is the ratio between the distances between the points P and Pi on the one hand and P and Pi+1 on the other hand; the interpolation is such that this ratio of distances between the interpolated lineation passing through P and the lineations Li and Li+1 is retained and equal to R along any segment parallel to the segment (Pi, Pi+1) limited by the two lineations Li and Li.

FIG. 5 shows the sum trace obtained by the method according to the invention, such as described above, applied to the collection of FIG. 1. The summing was carried out from the lineations in FIG. 4, in a summing corridor centered on the pivot curve and having a half-width equal to 7 traces. The sum trace of FIG. 5 should be compared to the sum trace of FIG. 2 obtained by carrying out the horizontal summing of the samples of the collection of FIG. 1 associated with the same time.

Figure 6:
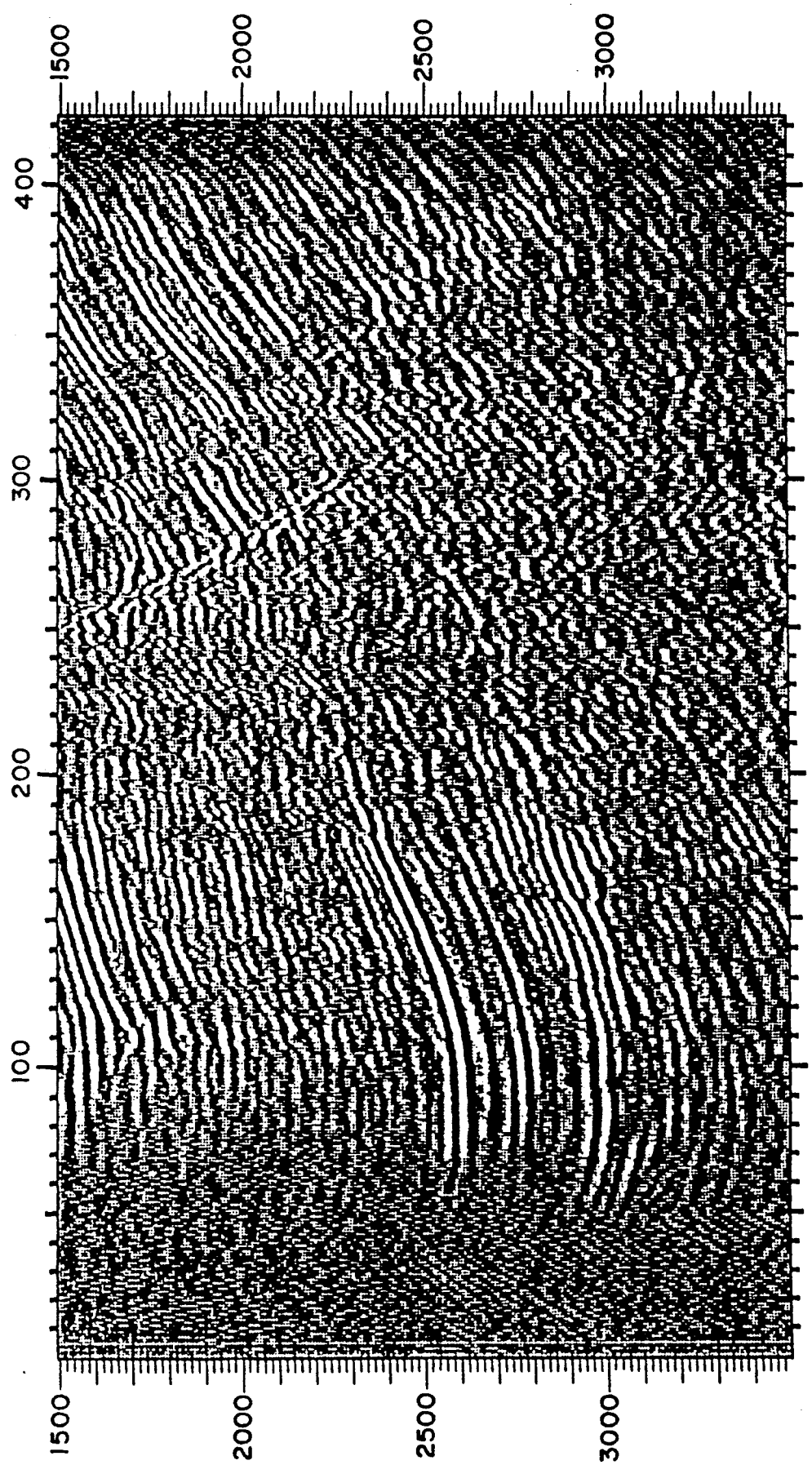
FIG. 6 shows a complete seismic section obtained from the conventional method with horizontal summing.
Figure 7:
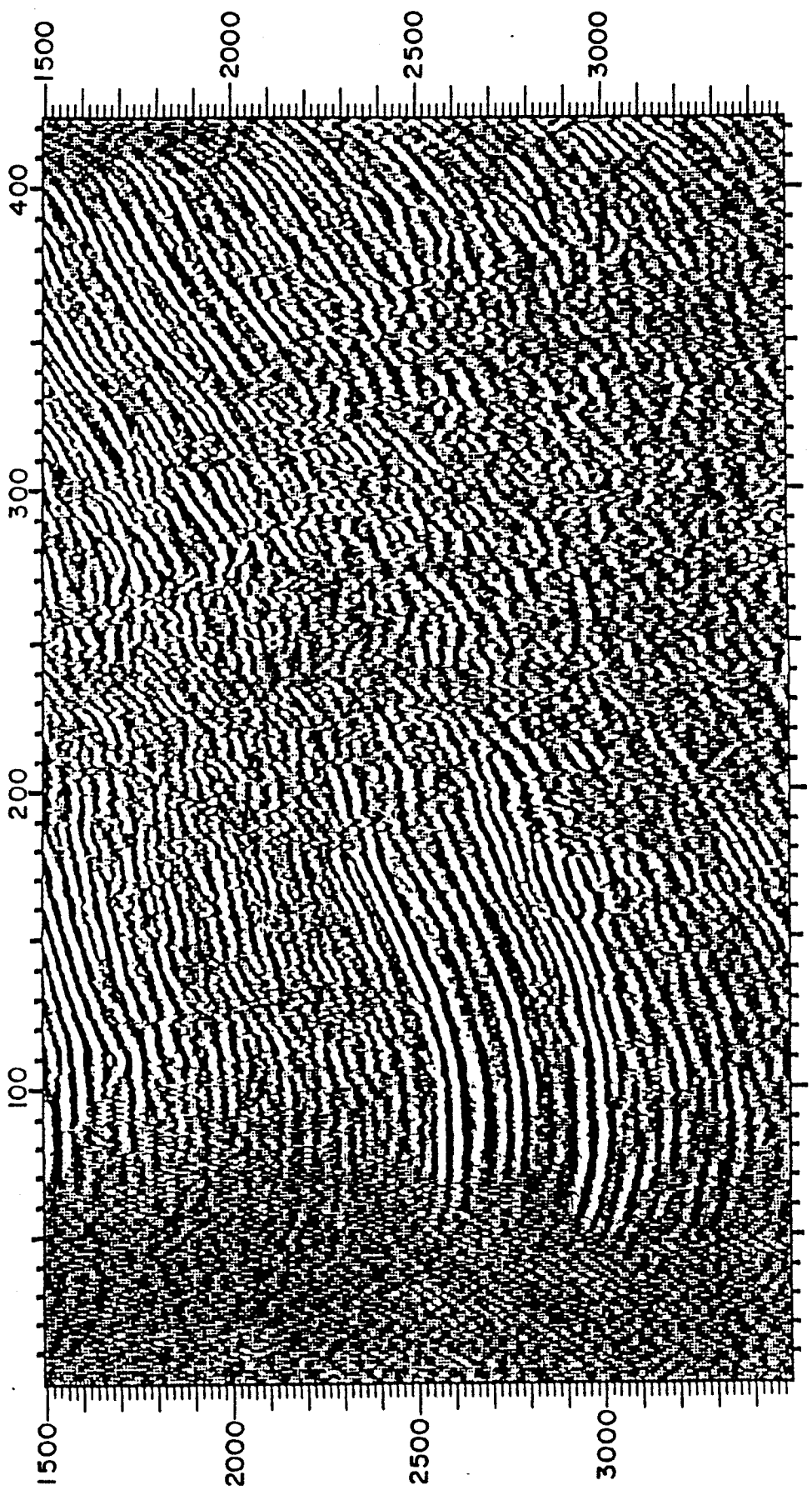
FIG. 7 shows this same section obtained using an embodiment of the method according to the invention.

FIGS. 6 and 7 allow the comparison of the processing according to the invention (FIG. 7) with the conventional processing with horizontal summing (FIG. 6) over a complete seismic section constituted by the juxtaposition of sum traces of the type of that of FIGS. 3 or 4, the trace of FIG. 2 being the 1st trace of the section of FIG. 6 and the trace of FIG. 5 being the 1st trace of FIG. 7. Except for the summing method, all of the processings applied to the elementary recordings from which the sections of FIGS. 6 and 7 were constructed are identical. A distinct improvement in the signal/noise ratio will be noted in FIG. 7.

Numerous variations of these processings described above by way of example are possible to those skilled in the art. Such variations are not to be regarded as departing from the scope of the invention. All such modifications are intended to be included within the scope of the following claims.

What is claimed is:

1. A method of generating improved sum traces during exploration of an environment by seismic reflection, in order to obtain an improved seismic section, the method comprising the steps of:

generating collections of elementary recordings obtained by a multiple cover technique;

processing the generated collections of elementary recordings in control mean such that each of the collections are referenced in planes having coordinate axes of X in abscissas, expressing a distance, and of T in ordinates, expressing a time or a depth, with reflections from the subsoil appearing as sub-horizontal lineations associated with extrema of recordings correlating with each other; and transforming each of the processed collections of elementary recordings into an improved sum trace to obtain an improved seismic section, comprising the steps of summing samples of the elementary recordings of the collection which are associated with a same time in order to obtain a conventional sum trace, determining the dimensions Ti of the conventional sum trace for which amplitude peaks Pi occur, picking out the sub-horizontal lineations present in the collection;

selecting in the collection, in accordance with a given method, within each range PLi of predetermined width Ti-$\Delta$Ti to ti+$\Delta$Ti surrounding each of the dimensions Ti and intercepting a certain number of sub-horizontal lineations, at the most one of these sub-horizontal lineations considered as a most representative of a studied range, Li, designating a summing corridor of predetermined width which surrounds a pivot curve passing through point Pj of coordinates Tj, each belonging to a selected sub-horizontal lineation Lj, and summing within the summing corridor, samples located along the sub-horizontal lineations in order to obtain a sum trace, according to a method for which an amplitude at the time Tj is the result of summing along the sub-horizontal lineation Lj and an amplitude at a time T between two times Tj and Tj+1, the result of said summing of the samples located on a sub-horizontal lineation being obtained by interpolation between successively selected sub-horizontal lineations Lj and Lj+1.

2. The method of generating improved sum traces according to claim 1, wherein said step of selecting the sub-horizontal lineation which is the most representative of each of the ranges PLi comprising:

selecting in each of the ranges PLi at least two sub-horizontal lineations conforming to a given criterion, this selection being carried out by starting with the dimension T1 associated with the peak of maximum amplitude in absolute value of the conventional sum trace and ending, in order, with the dimension Tk associated with the peak of minimum amplitude in absolute value of the conventional sum trace and by not taking into account sub-horizontal lineations if they have already been selected once; and choosing just one of these two or more sub-horizontal lineations, selected according to a predetermined criterion, taking into account at least the sub-horizontal lineations selected in the range above or below that of the selection.

3. The method of generating improved sum traces according to claim 1, wherein said step of selecting the sub-horizontal lineation which is the most representative of each of the ranges Pli is carried out according to a given criterion, this selection being carried out by starting with the dimension T1 associated with the peak of maximum amplitude in absolute value of the conventional sum trace and ending, in order, with the dimension Tk associated with the peak of minimum amplitude in absolute value of the conventional sum trace and by not taking into account sub-horizontal lineations if they have already been selected once.

4. The method of generating improved sum traces according to either of claims 2 or 3, wherein the given criterion of selection for a lineation in a range depends on an average of absolute amplitudes of the extrema associated with the sub-horizontal lineation, this average being greater than the average of the absolute amplitudes of the extrema associated with the sub-horizontal lineations of the range which are not selected.

5. The method of generating improved sum traces according to claim 1, wherein the peaks taken into account are the extrema of the conventional sum trace.

6. The method of generating improved sum traces according to claim 1, wherein the peaks taken into account are the maxima of an envelope of a straightened conventional sum trace.

7. The method of generating improved sum traces according to claim 1, further comprising the step of forming the improved seismic section by juxtaposition of the improved sum traces obtained from all the collections of elementary recordings.

8. A method of generating improved sum traces during exploration of an environment by seismic reflection, in order to obtain an improved seismic section, the method comprising the steps of:
generating collections of elementary recordings obtained by a multiple cover technique;
processing the generated collections of elementary recordings in control means such that each of the collections are referenced in planes having coordinate axes of X in abscissas, expressing a distance, and of T in ordinates, expressing a time or a depth, with reflections from the subsoil appearing as sub-horizontal lineations associated with extrema of recordings correlating with each other;
transforming each of the processed collections of elementary recordings into an improved sum trace, comprising the steps of
summing samples of the elementary recordings of the collection which are associated with a same time in order to obtain a conventional sum trace,
determining the dimensions Ti of the conventional sum trace for which amplitude peaks Pi occur,
picking out the sub-horizontal lineations present in the collection,
selecting in the collection, in accordance with a given method, within each range PLi of predetermined width Ti−ΔTi to Ti+ΔTi surrounding each of the dimensions Ti and intercepting a certain number of sub-horizontal lineations, at the most one of these sub-horizontal lineations considered as a most representative of a studied range, Li,
designating a summing corridor of predetermined width which surrounds a pivot curve passing through points Pj of coordinates Tj each belonging to a selected sub-horizontal lineation Lj, and
summing within the summing corridor, samples located along the sub-horizontal lineations in order to obtain a sum trace, according to a method for which an amplitude at the time Tj is the result of summing along the sub-horizontal lineation Lj and an amplitude at a time T between two times Tj and Tj+1, the result of said summing of the samples located on a sub-horizontal lineation being obtained by interpolation between successively selected sub-horizontal lineations Lj and Lj and Lj+1; and
generating the improved seismic section by juxtaposition of the improved sum traces obtained from all the collections of elementary recordings.

9. The method of generating improved sum traces of claim 1, the improved sum traces being displayed as oil exploration data.

10. The method of generating improved sum traces of claim 8, the improved sum traces being displayed as oil exploration data.

11. A method of processing signals recorded on the surface of the ground during the exploration of an environment by seismic reflection, in order to obtain an improved seismic section, the method comprising the steps of:
generating collections of elementary recordings obtained by the multiple cover technique, the recordings having undergone a processing such that each of the collections, referenced in a plane having coordinate axes of X in abscissas, expressing a distance, and of T in ordinates, expressing a time or a depth, the reflections from the subsoil appearing as sub-horizontal lineations associated with extrema of recordings correlating with each other;
processing each of the collections of elementary recordings to transform each collection into an improved sum trace, comprising the steps of
summing samples of the elementary recordings of the collection which are associated with a same time in order to obtain a conventional sum trace,
determining the dimensions Ti of the conventional sum trace for which amplitude peaks Pi occur,
picking out the sub-horizontal lineations present in the collection,
selecting in the collection, in accordance with a given method, within each range PLi of predetermined width Ti−ΔTi to Ti+ΔTi surrounding each of the dimensions Ti and intercepting a certain number of sub-horizontal lineations, at the most one of these sub-horizontal lineations considered as the most representative of the studied range, Li,
designating a summing corridor of predetermined width which surrounds a pivot curve passing through the point Pj of coordinates Tj, each belonging to a selected sub-horizontal lineation Lj, and
summing within the summing corridor, samples located along the sub-horizontal lineations in order to obtain a sum trace, according to a method for which an amplitude at the time Tj is the result of summing along the sub-horizontal lineation Lj and the amplitude at a time T between two times Tj and Tj+1, the result of said summing of the samples located on a sub-lineation being obtained by interpolation between successively selected sub-horizontal lineations Lj and Lj+1; and
generating the improved seismic section by juxtaposition of the improved sum traces obtained from all the collections of elementary recordings.

* * * * *